(12) United States Patent
Rogall et al.

(10) Patent No.: US 7,513,742 B2
(45) Date of Patent: Apr. 7, 2009

(54) PITCH DRIVE SYSTEM FOR A WIND TURBINE

(75) Inventors: Peter Rogall, Emsburen (DE); Patrick Achenbach, Rheine (DE)

(73) Assignee: General Electric Company, Schenectady, NY (US)

( * ) Notice: Subject to any disclaimer, the term of this patent is extended or adjusted under 35 U.S.C. 154(b) by 516 days.

(21) Appl. No.: 11/250,748

(22) Filed: Oct. 14, 2005

(65) Prior Publication Data

US 2006/0083615 A1    Apr. 20, 2006

(30) Foreign Application Priority Data

Oct. 14, 2004    (EP)    ................................ 04024520

(51) Int. Cl.
*F03D 7/00*    (2006.01)
*F03D 7/02*    (2006.01)

(52) U.S. Cl. ........................................ 416/47; 416/155
(58) Field of Classification Search ................... 416/26, 416/27, 33, 47, 155
See application file for complete search history.

(56) References Cited

U.S. PATENT DOCUMENTS

| | | | | |
|---|---|---|---|---|
| 4,348,155 A | * | 9/1982 | Barnes et al. | ................. 416/46 |
| 4,462,753 A | * | 7/1984 | Harner et al. | ................. 416/48 |
| 6,783,326 B2 | * | 8/2004 | Weitkamp et al. | ............... 416/1 |
| 7,261,517 B2 | * | 8/2007 | Uphues et al. | ............... 416/153 |
| 2004/0052635 A1 | * | 3/2004 | Wobben | ..................... 415/4.1 |

FOREIGN PATENT DOCUMENTS

| | | | |
|---|---|---|---|
| DE | 37 22 022 C1 | * | 9/1988 |
| DE | 197 20 025 A1 | | 5/1997 |
| DE | 101 16 011 A1 | | 3/2001 |
| EP | 1 286 048 A1 | | 2/2003 |
| EP | 1 647 708 A1 | | 4/2006 |

OTHER PUBLICATIONS

Official Office Action of May 18, 2006 for European Appln. No. EP 1 286 048, mailed May 18, 2006.
Hau, Erich, "*Windturbines*" chapter 8.4.6. pp. 236-237, Springer-Verlag, 2000 http://www.springer.de/engine/ (18 pages).

* cited by examiner

*Primary Examiner*—Edward Look
*Assistant Examiner*—Nathaniel Wiehe
(74) *Attorney, Agent, or Firm*—Blakely, Sokoloff, Taylor & Zafman LLP

(57) ABSTRACT

A pitch drive system for a wind turbine is provided which comprises a regulation drive for regulating the pitch of a rotor blade of the wind turbine during normal operation, the regulation drive comprising at least one drive train, and an emergency drive for pitching the rotor blade in case of emergency, the emergency drive comprising at least one drive train, wherein the at least one drive train of the emergency drive is separate from the at least one drive train of the regulation drive.

15 Claims, 6 Drawing Sheets

PITCH DRIVE SYSTEM FOR A WIND TURBINE

The present application claims priority to corresponding EP Application No. 04024520.1, filed on Oct. 14, 2004, the entire contents of which are hereby incorporated by reference.

FIELD OF THE INVENTION

The present invention relates to a pitch drive system for a wind turbine, particularly to a pitch drive system which comprises a regulation drive for regulating the pitch of a rotor blade of the wind turbine during normal operation, and an emergency drive for pitching the rotor blade in case of emergency. The present invention further relates to wind turbines with pitch drive systems comprising both a regulation drive and an emergency drive.

BACKGROUND OF THE INVENTION

Typically, modern wind turbines have rotor blades with adjustable pitch angle. The rotor blades can be rotated about their longitudinal axis by use of a pitch drive disposed in the rotor hub. Typically, the pitch drive is actuated electrically or hydraulically. By adjusting the pitch angles of the rotor blades, the power generation of the wind turbine can be controlled as well as an aerodynamical braking of the rotor can be accomplished. Particularly, the rotor blades generate a braking torque when moved into feather position. Thereby, the rotor blades ensure that the rotor is not further accelerated and, thus, the rotor blades form an aerodynamical brake for the wind turbine.

The aerodynamical brake effect of the rotor blades is also used for braking the rotor in case of emergency, e.g. when a failure of the drive system occurs or when the wind turbine is in an uncontrolled condition. Accordingly, it is very important that the emergency system works absolutely reliable even when the wind turbine is damaged or in an uncontrolled state, e.g. due to lightning. Especially, the pitch drive is required to function even in a power outage condition.

A redundant mechanical fallback system has been proposed in DE 197 20 025. Therein, the pitch drive is actuated by energy stored in springs which are coupled to the rotor blade via the same drive train as the electrical regulation drive. Thus, the structure of the drive train becomes very complicated.

As another solution to the problem of emergency backup, uninterruptible power supplies (UPS) for the pitch drive have been proposed, e.g. in chapter 8.4.6 of "*Windturbines*" by E. Hau, Springer-Verlag, 2000, pages 236 and 237. However, such an approach may fail when the electronics of the wind turbine is damaged, e.g., by lightning.

A further problem associated with the above prior art pitch drive systems is that failure in the electrical drive system leads to a shutdown of the wind turbine so that a yield loss occurs.

In DE 101 16 011, a pitch drive system is proposed which comprises more than one drive train for each rotor blade. However, each of the drive trains comprises an electric motor with battery backup for emergency. Accordingly, the pitch drive system of DE 101 16 011 is still fault-prone in cases where the electronics of the wind turbine is damaged, e.g., by lightning.

SUMMARY OF THE INVENTION

Embodiments of the present invention include a pitch drive system that overcomes the above mentioned problems associated with the prior art at least partly. Furthermore, an embodiment of the present invention includes a wind turbine with an improved pitch drive system.

Embodiments of the present invention include a pitch drive system, a regulation drive and a wind turbine. Further aspects, advantages and features of the present invention are apparent from the dependent claims, the description and the accompanying drawings.

In the following, the terms control drive and regulation drive are used interchangeably. Also, the terms emergency drive and auxiliary drive are used interchangeably.

According to a first aspect of the present embodiment, a pitch drive system for a wind turbine is provided which has a control drive for controlling the pitch of a rotor blade of the wind turbine during normal operating conditions and an auxiliary drive for pitching the rotor blade to accomplish an emergency shutdown. The control drive as well as the auxiliary drive each comprise a drive section which are disjoint from each other.

The separation of the drive trains of the regulation drive and the emergency drive lowers the complexity of the individual drive train assembly. Furthermore, the pitch drive system can be designed in a modular manner which does not only facilitate the assembly of the system but does also increase the operational safety and reliability. Particularly, the risk that the emergency drive cannot operate due to a gear box failure of the regulation drive is eliminated. This reliability aspect is especially important for off-shore applications where maintenance is costly, complicated and scheduled at large intervals.

According to another embodiment of the present invention, the emergency drive comprises at least one further drive train.

Thus is a further redundancy of the emergency drive provided so that the operational safety and reliability of the pitch drive system are further improved. Particularly, the separation of the emergency drive into two or more separate drive trains reduces the risk of a failure of the emergency drive because of enhanced redundancy. A further advantage of this embodiment is that a modular structure of the emergency drive can be established. For example, emergency drive modules providing a predetermined torque can be manufactured independently from the design of the wind turbine pitch drive. When dimensioning the emergency drive, a sufficient number of these modules is assembled to provide the required total torque to feather the rotor blade. Furthermore, more emergency drive modules than necessary can be assembled to provide redundancy so that sufficient torque is applied even in a case where one or more emergency drive modules fail.

According to another aspect of the present invention, a control drive for a pitch drive system is provided which comprises a pinion wheel for meshing with a toothed wheel, a gear box coupled to the pinion wheel, and at least two motors coupled to the gear box.

The regulation drive according to this aspect prevents a system shutdown when one of the motors fails since the other motor can still operate the regulation drive. Thus, the wind turbine can stay in operation and the yield is not reduced. Furthermore, the redundancy requirements for the regulation drive are not as high as for the emergency drive. Therefore, the small risk that a gear box failure occurs is acceptable for the regulation drive. The more important aspect with respect to the regulation drive is that the motors are coupled to the same gear box so that space is saved.

BRIEF DESCRIPTION OF DRAWINGS

A full and enabling disclosure of the present invention, including the best mode thereof, to one of ordinary skill in the art, is set forth more particularly in the remainder of the specification, including reference to the accompanying figures wherein.

DESCRIPTION OF THE PREFERRED EMBODIMENTS

Reference will now be made in detail to the various embodiments of the present invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
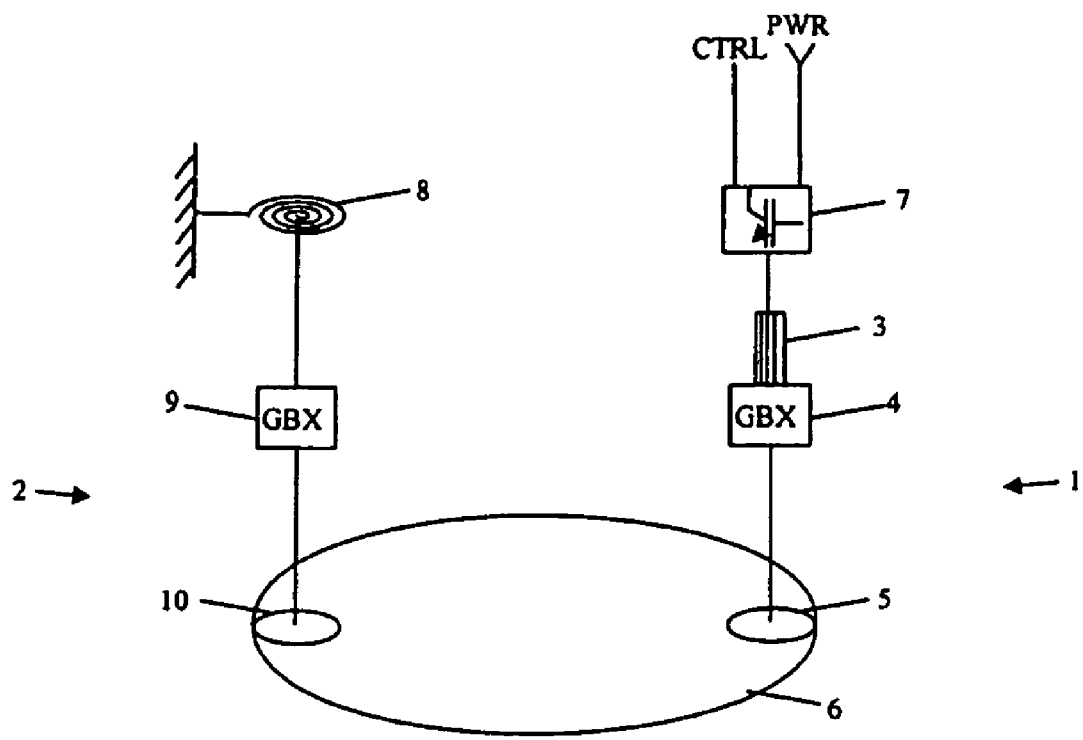
FIG. 1 shows a pitch drive system according to a first embodiment of the present invention.

FIG. 1 shows an embodiment of the present invention according to a first embodiment of the present invention. Therein, the pitch drive system comprises a regulation drive 1 and an emergency drive 2. The regulation drive 1 and the emergency drive 2 comprise separate drive trains. Thus, the complexity of the individual drive train assemblies 1, 2 is lowered compared to drive trains where regulation drive and emergency drive share a drive train.

The regulation drive 1 comprises an actuator 3, a gearbox 4 and a pinion wheel 5. Actuator 3 is coupled to gear box 4 and pinion wheel 5 engages with an internal toothing of internal gear 6. The actuator 3 is coupled to a power supply and a control unit (not shown) via servo amplifier 7. Typically, actuator 3 is an electric motor, e.g., an DC motor or a three-phase asynchronous motor. Also, the actuator 3 may comprise a hydraulic element.

The emergency drive 2 comprises an actuator 8, a gear box 9 and a pinion wheel 10. Actuator 8 is coupled to gear box 9 and pinion wheel 10 engages with the internal toothing of internal gear 6. Typically, actuator 8 is a mechanical energy storage, e.g. a spring storage. Also, actuator 8 may comprise a hydraulic pressure storage.

During normal operation, the pitch of a rotor blade coupled to gear 6 is controlled via regulation drive 1. To this end, a control signal is applied to servo amplifier 7 and motor 3 is supplied with power. The motor torque of motor 3 is applied to gear 6 via gear box 4 and pinion wheel 5. Thus, the rotor blade is rotated around its longitudinal axis.

When a case of emergency occurs and the electrical part of the pitch drive system fails, the mechanical energy stored in actuator 8 is released and torque is applied to gear 6 via gear box 9 and pinion wheel 10. Thus, the rotor blade is rotated around its longitudinal axis into feather position and the wind turbine is braked. Typically, the mechanical energy is stored in spring storages as they are described, e.g., in international patent application PCT/EP2004/008444 which is hereby incorporated by reference. Also, a hydraulic element may be used to store mechanical energy in form of hydraulic pressure.

Figure 2:
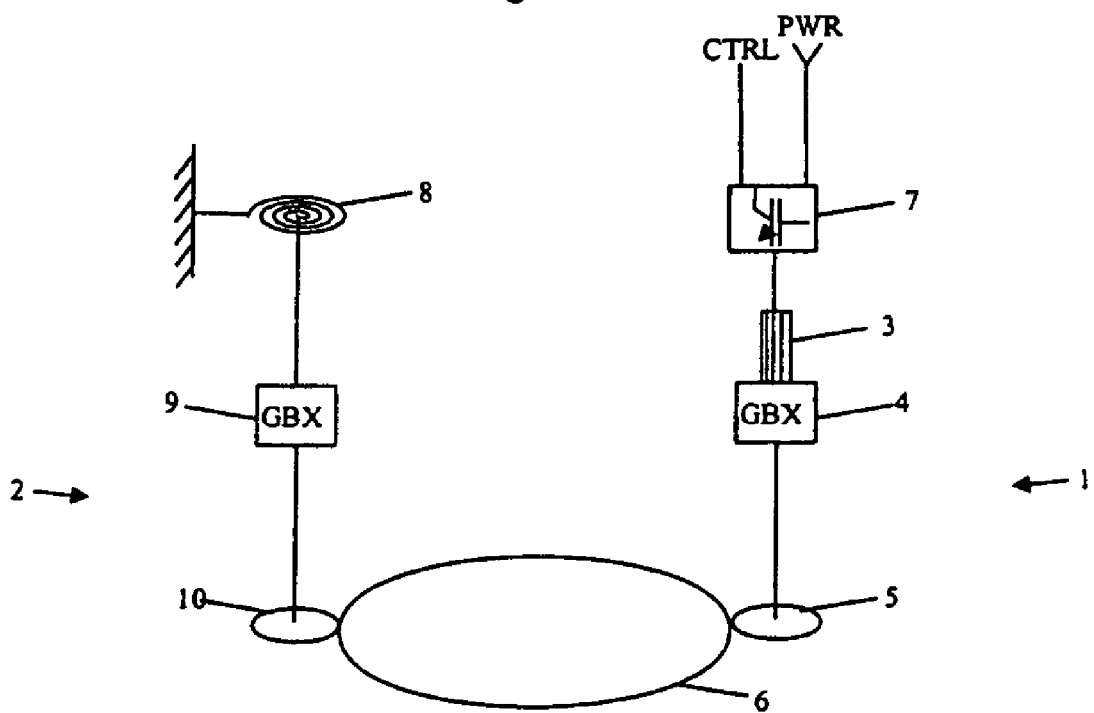
FIG. 2 shows a pitch drive system according to an embodiment of the present invention.

Another embodiment of the present invention is described with reference to FIG. 2. Therein, the pitch drive system comprises a regulation drive 1 and an emergency drive 2 which are identical to those shown in FIG. 1. However, the pinion wheels 5 and 10 of regulation drive 1 and emergency drive 2 engage with an external toothing of gear 6.

Figure 3:
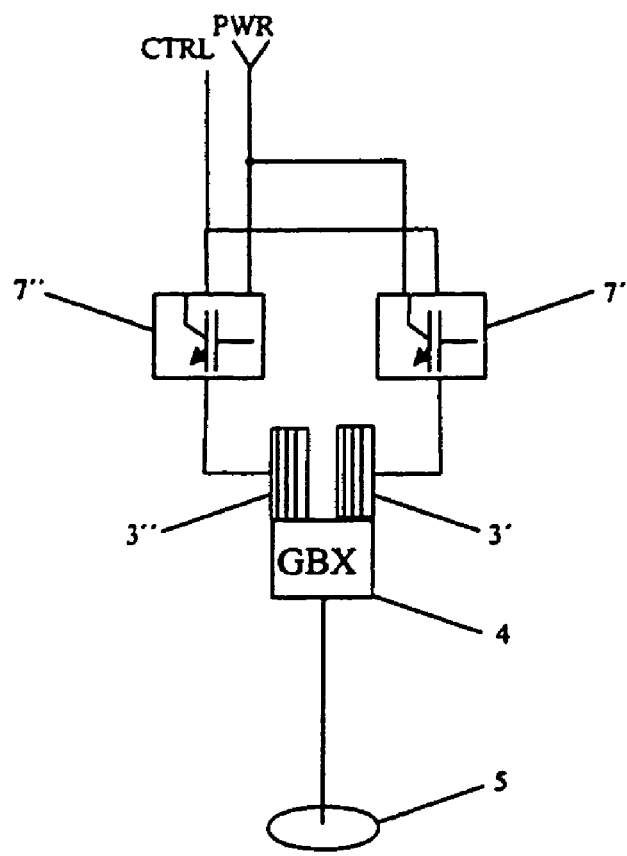
FIG. 3 shows a regulation drive according to a second embodiment of the present invention.

Next, a second aspect of the present invention is described with reference to FIG. 3. Therein, a regulation drive is shown. In contrast to the regulation drive of FIGS. 1 and 2, the regulation drive of the present embodiment comprises first and second actuators 3', 3", which are coupled to the same gear box 4. The regulation drive according to this embodiment prevents a system shutdown when only one of the actuators fails since the other actuator can still operate the regulation drive. Thus, the wind turbine can stay in operation and the yield is not reduced even though the pitch velocity may be derated. Typically, actuators 3', 3" are electric motors, e.g., DC motors or three-phase asynchronous motors. Also, actuators 3', 3" may each comprise a hydraulic element. Each of the motors 3', 3" is coupled to a power supply and a control unit via a respective servo amplifier 7', 7".

Figure 4:
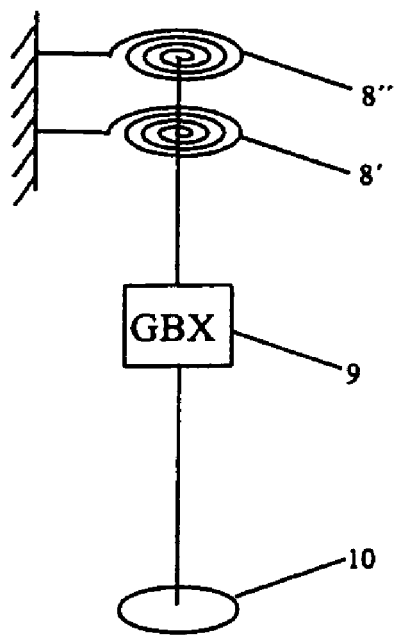
FIG. 4 shows an emergency drive according to an embodiment of the present invention.

FIG. 4 shows an emergency drive according to another embodiment of the present invention. Therein, a first actuator 8' and a second actuator 8" are coupled to the same gear box 9. Thus, twice of the torque is provided in case of emergency. Furthermore, the redundancy of the emergency drive is increased so that a failure of the emergency drive becomes more unlikely.

Figure 5:
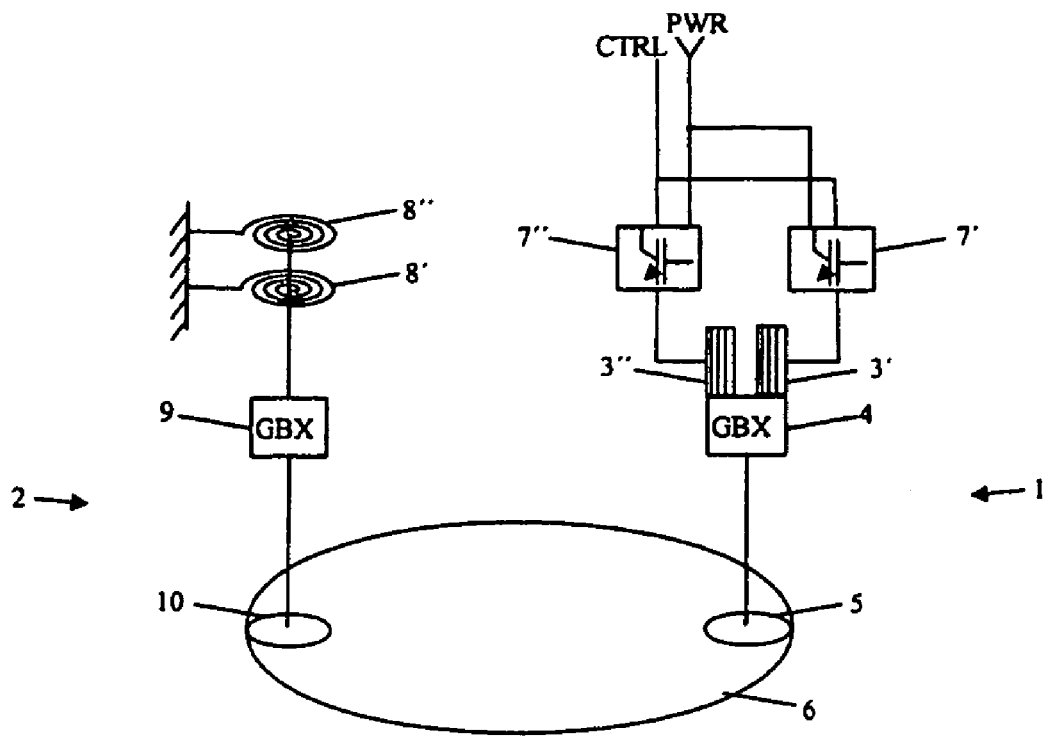
FIG. 5 shows a pitch drive system according to a further embodiment of the present invention.

FIG. 5 shows a further embodiment of the present invention which has a similar structure than the embodiment shown in FIG. 1. However, in this embodiment the regulation drive 1 is formed according to the embodiment shown in FIG. 3, i.e. it comprises two motors 3', 3" coupled to the same gear box 4. Similarly, the emergency drive 2 is formed according to the embodiment shown in FIG. 4, i.e. it comprises two mechanical energy storages 8', 8" coupled to the same gear box 9. The pinion wheels 5, 10 of regulation drive 1 and emergency drive 2 mesh with the internal toothing of internal gear 6.

Figure 6:
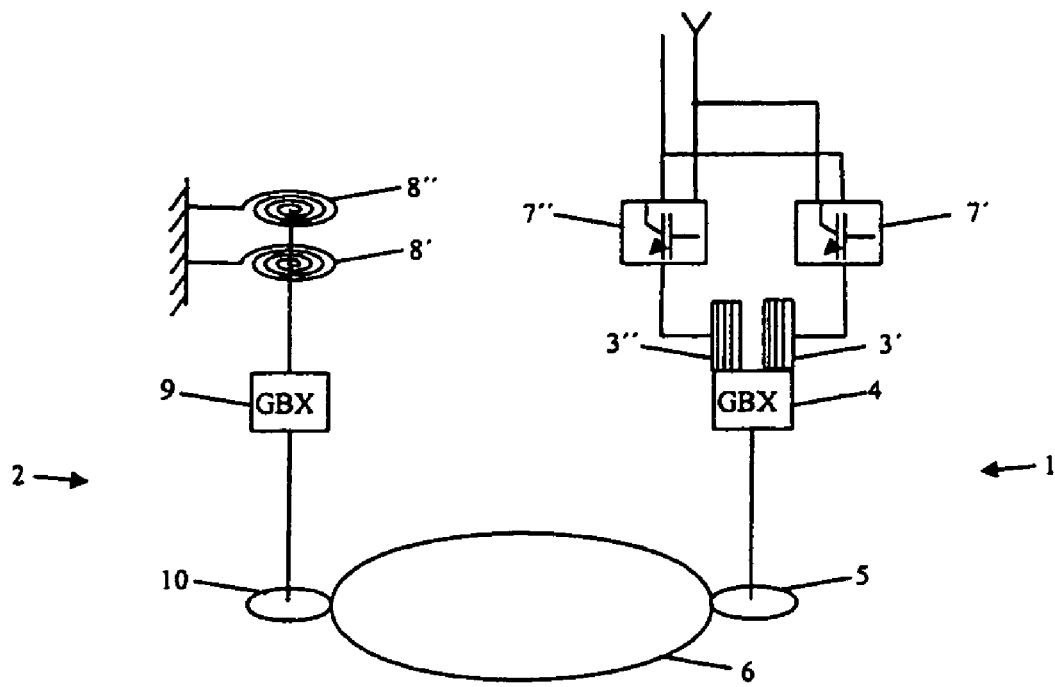
FIG. 6 shows a pitch drive system according to still a further embodiment of the present invention.

An alternative embodiment similar to the one of FIG. 5 is shown in FIG. 6. The principal design of the regulation drive 1 and the emergency drive 2 is identical to the embodiment shown in FIG. 5. However, the pinion wheels 5, 10 mesh with an external toothing of gear 6.

Due to the increased redundancy of the embodiments shown in FIGS. 5 and 6, the risk of a failure of either the regulation drive 1 or the emergency drive 2 can be considerably reduced.

Figure 7:
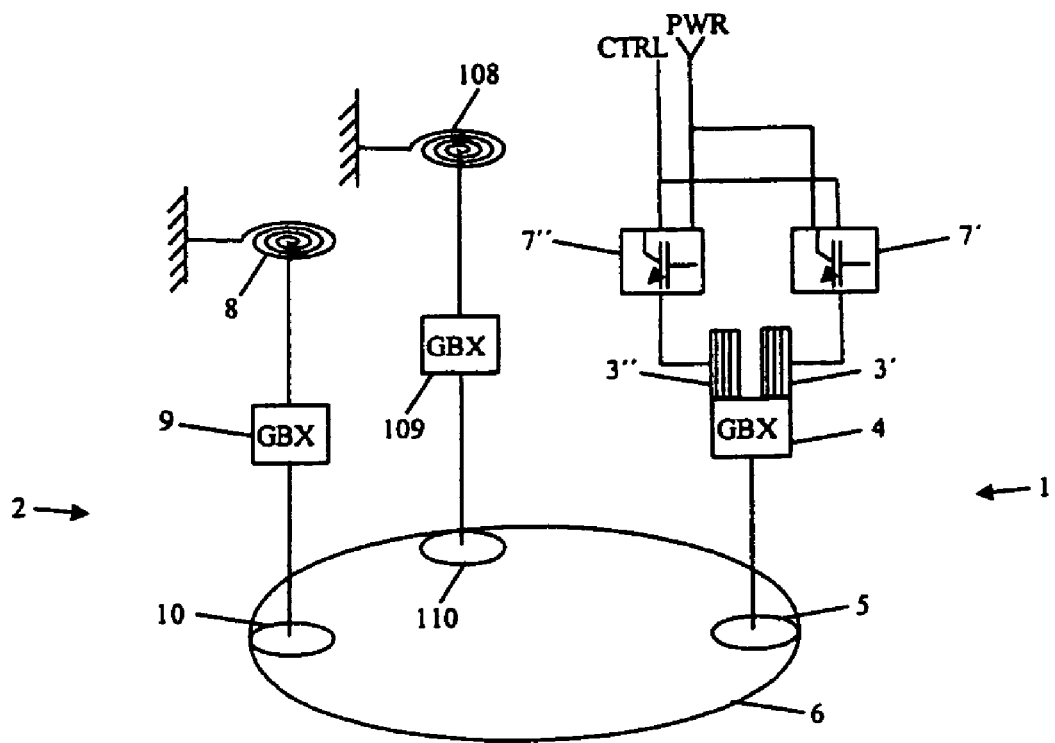
FIG. 7 shows a pitch drive system according to still another embodiment of the present invention.

FIG. 7 shows a further embodiment of the present invention. Therein, the regulation drive 1 is formed according to the embodiment shown in FIG. 3, i.e. it comprises two motors 3', 3" coupled to the same gear box 4. However, the emergency drive 2 comprises two separate drive trains, each of them having a mechanical energy storage 8, 108, a gear box 9, 109, and a pinion wheel 10, 110. The pinion wheels 5, 10, 110 of regulation drive 1 and emergency drive 2 mesh with the internal toothing of internal gear 6.

Figure 8:
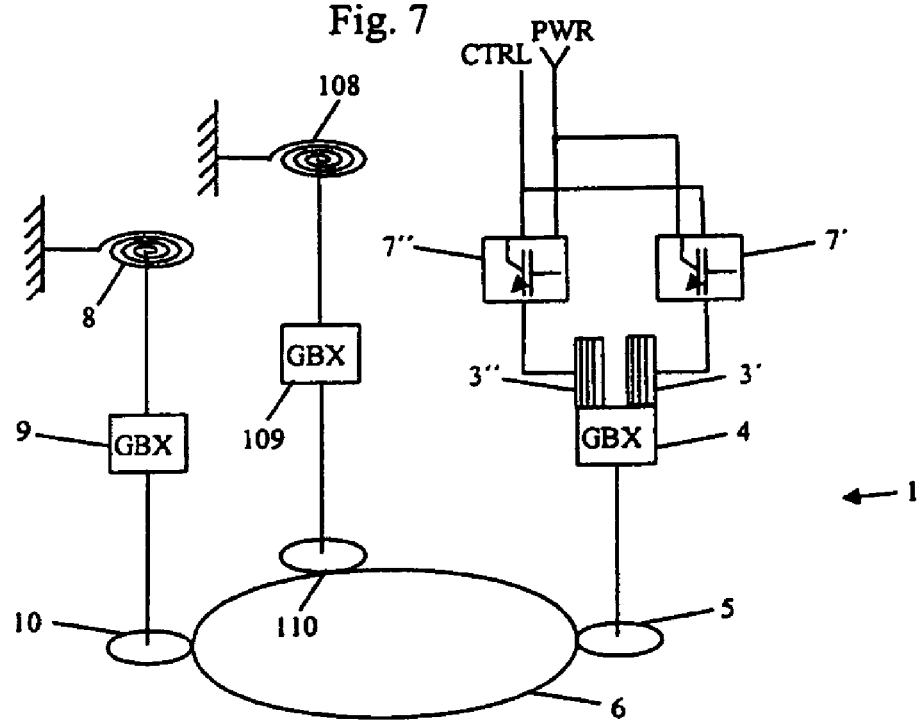
FIG. 8 shows a pitch drive system according to still another embodiment of the present invention.

An alternative embodiment similar to the one of FIG. 7 is shown in FIG. 8. The principal design of the regulation drive 1 and the emergency drive 2 is identical to the embodiment shown in FIG. 7. However, the pinion wheels 5, 10, 110 mesh with an external toothing of gear 6.

Compared to the embodiments shown in FIGS. 5 and 6, the embodiments of FIGS. 7 and 8 show an even improved redundancy of the emergency drive 2. Particularly, also serious damage due to a failure of the gear boxes 9, 109 is considerably reduced since it is very unlikely that both gear boxes 9, 109 will fail at the same time. Furthermore, the arrangements according to FIGS. 7 and 8 are advantageous in that prefabricated emergency drive modules with a predetermined operational torque can be used. Thus, the modules can be designed independent of the actual design of the pitch drive. When assembling the pitch drive, a sufficient number of the emergency drive modules can be used so that their total torque is sufficient for pitching the rotor blade into feather position. This allows for modular design and, thus, lowers the manufacturing costs of a pitch drive system while simultaneously increasing the operational reliability of the system.

Figure 9:
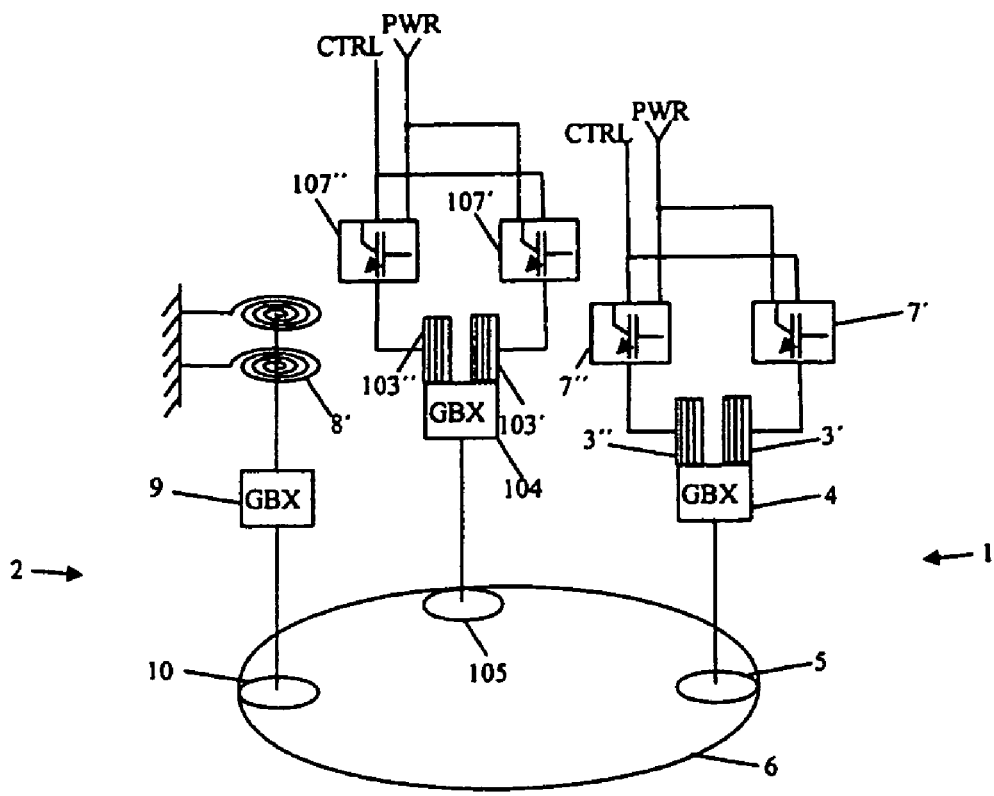
FIG. 9 shows a pitch drive system according to a further embodiment of the present invention.

The same idea of modular design can be applied to the regulation drive 1 as it is shown in FIG. 9. Therein, the regulation drive 1 comprises two separate drive trains, each including two actuators 3', 3", 103', 103", a gear box 4, 104, and a pinion wheel 5, 105. Thus, the same advantages of modular design as described above with respect to FIGS. 7 and 8 are achieved for the regulation drive 1.

Figure 10:
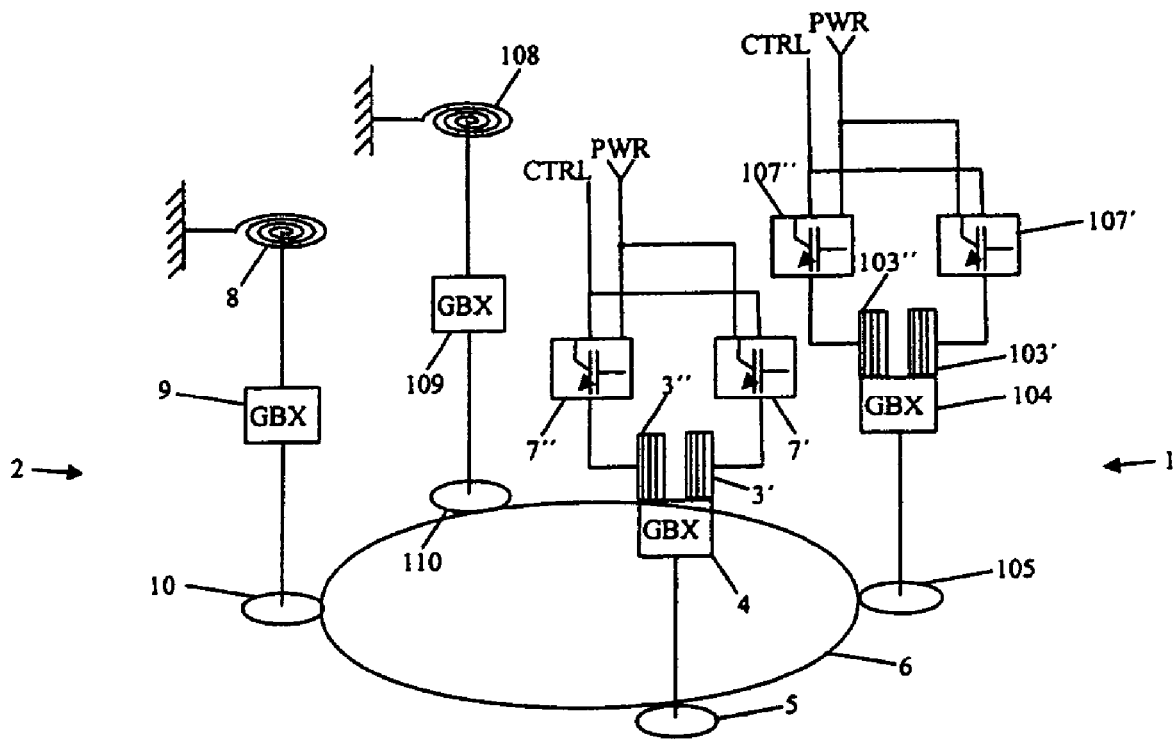
FIG. 10 shows a pitch drive system according to still a further embodiment of the present invention.

Finally, a combination of the embodiments shown in FIGS. 7, 8, and 9 is shown in FIG. 10. Therein, both the regulation drive 1 and the emergency drive 2 comprise two disjoint drive trains, so that maximum modularity and redundancy is provided by this design.

Figure 11:
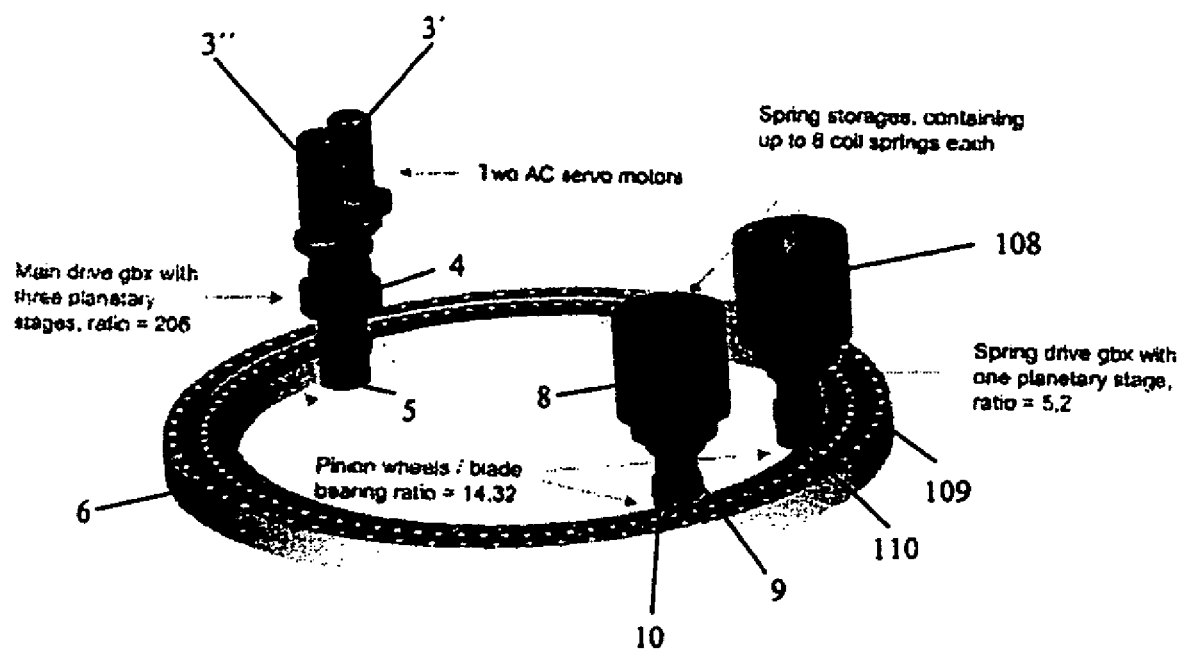
FIG. 11 shows a pitch drive system according to still another embodiment of the present invention.

A specific embodiment of the present invention corresponding to the embodiment of FIG. 7 is shown in FIG. 11. Therein, the regulation drive comprises two AC servo motors 3', 3", coupled to a gear box 4 with three planetary stages. The gear box provides a ratio of 206. The output shaft of the gear box 4 is coupled to a pinion wheel 5 meshing with the internal toothing of an internal gear 6. The internal gear 6 is part of the rotor blade bearing. The ratio between pinion wheel 5 and gear 6 is 14.32. The emergency drive comprises two separate drive trains each comprising a spring storage 8, 108 with up to 8 coils, a gear box 9, 109 with one planetary stage having a ratio of 5.2, and a pinion wheel 10, 110 having also a ratio of 14.32 with respect to the internal toothing.

It should be understood that the pitch drive system according to any of the above described embodiments can be disposed inside or at least partially outside the rotor hub. Furthermore, it should be understood that also more than two separate drive trains can be provided in the regulation drive as well as in the emergency drive. Also, each of the emergency drive trains may comprise more than one or two mechanical energy storages. Moreover, each combination of the above embodiments is within the scope of the present invention. Especially, the pinion wheels may engage an internal toothing or an external toothing in each of those combinations.

Furthermore, a wind turbine having a pitch drive system according to any of the above described embodiments is provided according to another aspect of the present invention. Thus, wind turbine with a highly reliably, easy to maintain and easy to assemble pitch drive system is provided. Such a wind turbine is especially advantageous for off-shore applications.

Having thus described the invention in detail, it should be apparent for a person skilled in the art that various modifications can be made in the present invention without departing from the spirit and scope of the invention as set forth in the following claims.

What is claimed is:

1. A pitch drive system for a wind turbine, comprising:
   a regulation drive for regulating the pitch of a rotor blade of the wind turbine during normal operation, the regulation drive comprising at least one drive train and first and second motorized actuators;
   an emergency drive for pitching the rotor blade in case of emergency, the emergency drive comprising at least one drive train and an actuator having a mechanical energy storage element; and
   wherein the at least one drive train of the emergency drive is separate from the at least one drive train of the regulation drive.

2. The system according to claim 1, wherein the emergency drive comprises at least one further drive train and another actuator having a mechanical storage element.

3. The system according to claim 1, wherein the drive trains of the regulation drive and of the emergency drive each comprise:
   a pinion wheel for meshing with a toothed wheel and
   a gearbox coupled to the pinion wheel and the first and second motorized actuators.

4. The system according to claim 3, wherein the mechanical storage element is a spring storage or a hydraulic pressure storage.

5. The system according to claim 3, wherein the pinion wheels are meshing with the internal toothing of an internal gear.

6. The system according to claim 3, wherein the pinion wheels are meshing with the external toothing of a gear.

7. The system according to claim 3, wherein the pitch drive system is disposed inside a hub of the wind turbine.

8. The system according to claim 3, wherein the pitch drive system is disposed at least partially outside a hub of the wind turbine.

9. The system according to claim 1, wherein the first and second actuators of the regulation drive each comprise an electric motor.

10. The system according to claim 1, wherein the emergency drive comprises at least one further actuator having a mechanical energy storage element.

11. The system according to claim 1, wherein the regulation drive comprises at least one further drive train and third and fourth motorized actuators.

12. The system according to claim 11, wherein the emergency drive comprises at least one further actuator having a mechanical energy storage element.

13. A pitch drive system for a wind turbine, comprising:
    a regulation drive for regulating the pitch of a rotor blade of the wind turbine during normal operation, the regulation drive comprising at least one drive train, wherein the regulation drive comprises:
    a pinion wheel for meshing with a toothed wheel;
    a gear box coupled to the pinion wheel; and
    at least two motors coupled to the gear box, wherein the at least to motors electric motors;

an emergency drive for pitching the rotor blade in case of emergency, the emergency drive comprising at least one drive train and an actuator having a mechanical energy storage element; and wherein the at least one drive train of the emergency drive is separate from the at least one drive train of the regulation drive.

14. A pitch drive system according to claim 13, further comprising at least one further regulation drive comprising:

a pinion wheel for meshing with a toothed wheel;

a gear box coupled to the pinion wheel; and at least two motors coupled to the gear box, wherein the at least two motors are electric motors.

15. A wind turbine comprising:

a rotor blade; and a pitch drive system comprising:

a regulation drive for regulating the pitch of the rotor blade during normal operation the regulation drive comprising at least one drive train and first and second motorized actuators;

an emergency drive for pitching the rotor blade in case of emergency, the emergency drive comprising at least one drive train and an actuator having a mechanical energy storage element; and wherein the at least one drive train of the emergency drive is separate from the at least one drive train of the regulation drive.

* * * * *